Aug. 22, 1939.  L. F. PAGE  2,170,032

AUXILIARY CIRCULATING DEVICE FOR AUTOMOBILE HEATERS

Filed Jan. 25, 1938

INVENTOR.
Lionel F. Page.
BY
ATTORNEYS.

Patented Aug. 22, 1939

2,170,032

UNITED STATES PATENT OFFICE 2,170,032

AUXILIARY CIRCULATING DEVICE FOR AUTOMOBILE HEATERS

Lionel F. Page, Xenia, Ohio

Application January 25, 1938, Serial No. 186,790

1 Claim. (Cl. 237—12.3)

The invention relates to a circulating device for circulating the hot water from an automobile engine to an automobile heater while the engine is temporarily shut off, as for example during the short periods while a person might be making purchases or doing other errands, thus preventing the automobile from getting cold, particularly when other occupants are in the car. Another object is to provide a device of this type which may be employed with any heating system already used in the car by making but slight alterations in the pipe connections of the system.

A further object is to so contruct the circulating device that it will in no way interfere with the regular performance of the engine cooling-system or the heater while the engine is running. A still further object is to so construct the device that it may be operated cheaply and efficiently by the batteries of the car, or by individual batteries. Additional objects are to provide a device of this class which may be adapted to all types of automobiles and all types of hot water heaters, which is easy to install, and which can be manufactured and installed at a relatively low cost.

These and various other objects and advantages will be readily understood from the following description and from the accompanying drawing of a preferred embodiment of the invention, in which, however, modifications may be made without departing from the scope of the appended claim. In the drawing, Fig. 1 is a somewhat diagrammatic side elevation of an automobile engine and a hot water heater to which the invention has been applied;

Figure 1:
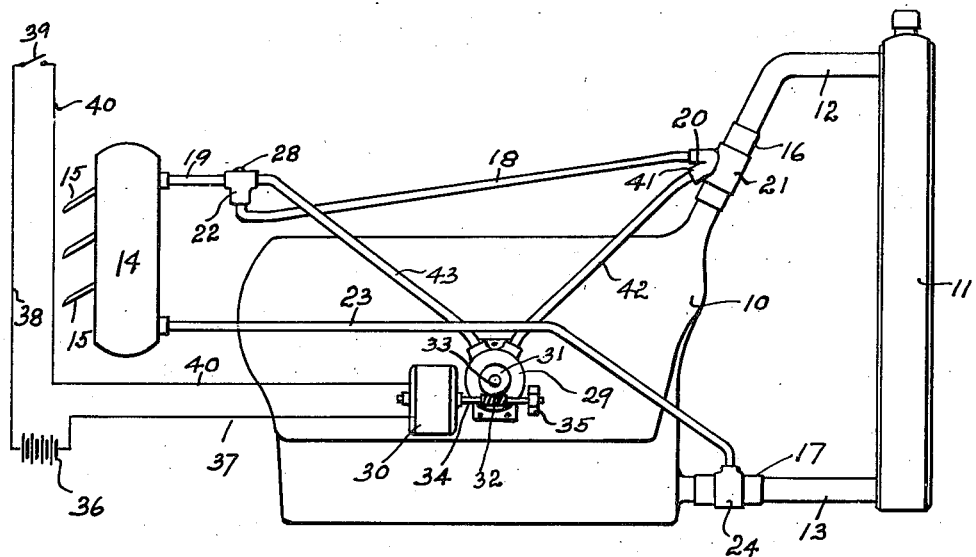
Figure 2:
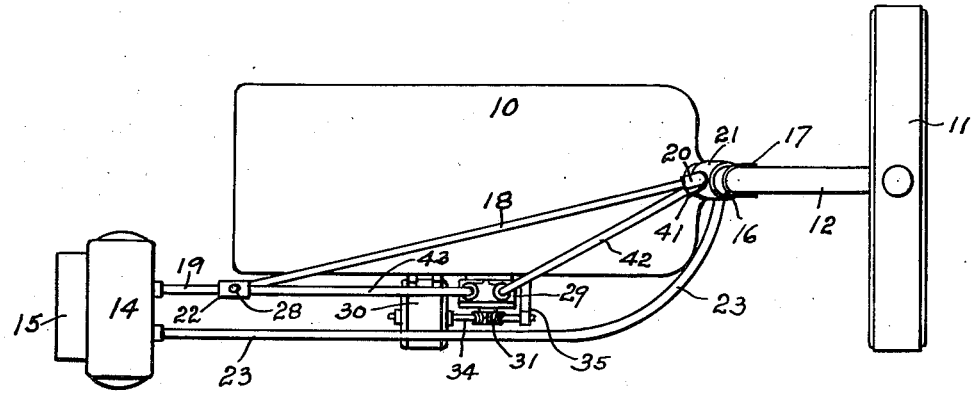
Fig. 2 is a plan view of Fig. 1.

Referring now to all the views, simultaneously, the engine is outlined at 10, the radiator of an automobile at 11, the pipes connecting the radiators with the engine at 12 and 13, and a hot water heater at 14. This heater is shown provided with the customary regulating shutters 15 and may, of course, be located any place in the automobile where found most suitable. The sleeves, by means of which the engine is generally connected to the pipes leading to the radiator, are shown at 16 and 17.

Ordinarily, the hot water from the engine is drawn from the pipe 12 to the heater by a single pipe. In this instant this pipe is made in two parts 18 and 19. One end of the pipe 18 is connected to a branch 20 of a Y-shaped fitting 21 which is tightly secured on the sleeve 16 and aligns with an opening in this sleeve. The other end of the pipe 18 is connected to the lower end of a check valve 22. The pipe 19 is connected between the check valve 22 and the heater 14, as plainly shown.

Normally, when the engine is running, hot water from the engine will flow through the fitting 21, branch 20, pipe 18, check valve 22, pipe 19, through the customary coil in the heater 14 and back through a pipe 23, connected between the heater and a fitting 24 secured on the sleeve 17 and aligned with an opening in this sleeve.

Figure 3:
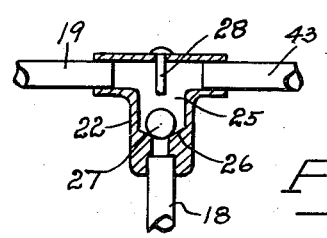
Fig. 3 is a cross-sectional elevation of a certain check valve employed in the device.

The construction of the check valve is plainly shown in Fig. 3. It consists of a valve chamber 25 provided with a valve seat 26 at its lower end against which a very light float 27 is seated. It is evident that as the water flows through the pipe 18, it will lift the float, thus disengaging it from the valve seat and allowing the water to flow through the valve chamber and hence to the pipe 19. To limit the movement of the float any suitable means may be employed, as for example the stop pin 28 which is shown secured in the top of the check valve.

The invention consists in inserting a circulating device in the water circuit of the heater. In the present case a rotary pump 29 is employed. This pump is driven by an electric motor 30. While a low-speed electric motor might be employed, I prefer to use a speed-reduction gear between the motor and the pump, as for example the worm-drive shown, in which the worm gear is shown at 31 and the worm at 32. The worm gear is mounted on the pump shaft 33, while the worm is mounted on the motor shaft 34. To support the outer end of the motor shaft a pedestal bearing 35 is preferably employed.

The motor may be driven by an individual battery, but I prefer to drive it from the battery of the automobile, as indicated in the electric diagram shown on the left hand side of Fig. 1 where the battery 36 is shown. A wire 37 connects the motor with the battery, another wire 38 connects the battery with one pole of a switch 39, while a wire 40 connects the other pole of this switch with the motor. Thus when the switch 39 is closed the motor will operate.

When the automobile engine is stopped and it is desired to operate the circulating device, the pump unit is started by closing the switch. This draws the hot water contained in top of the engine through another branch 41 of the Y-shaped fitting 21 and through a pipe 42 in through the pump, from which it is expelled through a pipe 43 which connects with the other end of the check valve 22, as plainly shown in Fig. 1. The water will now flow from the top of the engine through the fitting 21, branch 41, pipe 42, through the pump, through pipe 43, and finally, through the check valve and the pipe 19, into the heater 14, from which it is returned by the pipe 23 and the fitting 24. While the water flows through this circuit the float 27 is seated against the valve seat 26 so that the water will not back up to the pipe 18.

From the foregoing it will be seen that this method of utilizing the heat still contained in an automobile engine, for short periods of time while the engine is stopped, is very simple and the unit comparatively inexpensive to manufacture and install.

While in the present case I have illustrated a certain type of the motor unit, it is evident that any other suitable type might be employed. In like manner, any kind of hot-water heater, through which the water from the engine is circulated, may be employed.

While I have shown the circulating unit attached directly to the side of the engine, as this is possible in some instances, it is, of course, evident that this unit may be installed in any other suitable place, and in any other suitable manner in relation to the engine and the heater.

Having described the invention and its objects, what I claim as new and wish to protect by Letters Patent is:

In combination with an automobile hot water heater adapted to have the heated water from the automobile engine-cooling system which includes the radiator circulating through it, an independently driven water circulating device inserted in the circuit of the hot water heater to circulate the water through the heater if desired when the engine of the automobile is not running, said circuit comprising a conduit connected to the conduit of the engine cooling system leading from the engine into the bottom of the radiator, and into the bottom of the heater, and a conduit leading from the top of the heater to the circulating device and a conduit leading from the circulating device into the conduit which connects the top of the motor and the radiator, an independent conduit connecting the conduit from the top of the radiator and the conduit from the top of the heater, a check valve for preventing the flow of water back into the independent conduit, and means for starting and stopping said circulating device.

LIONEL F. PAGE.